July 30, 1940.    M. F. HUEBSCH    2,209,774
CLUTCH COUPLING
Filed March 7, 1938    2 Sheets-Sheet 1
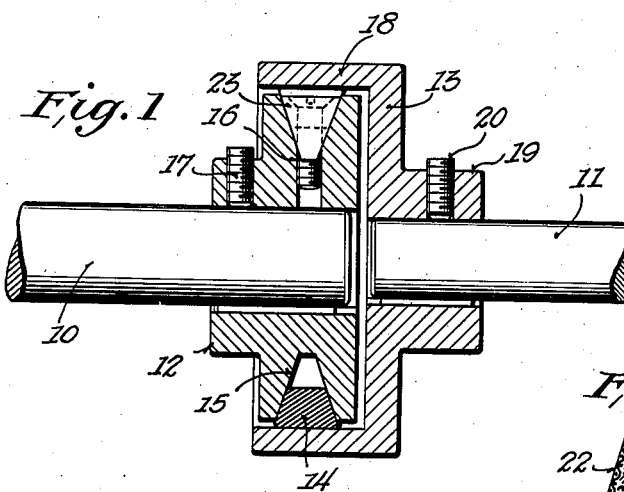
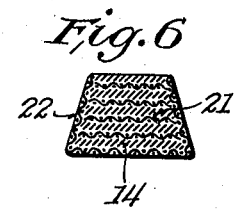
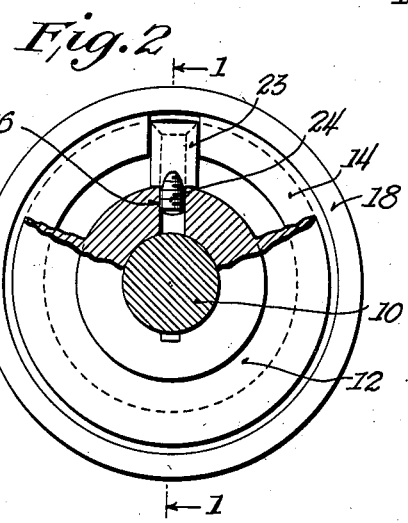
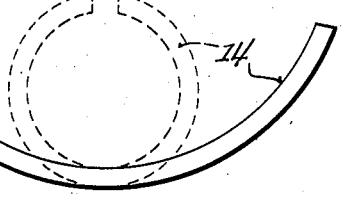
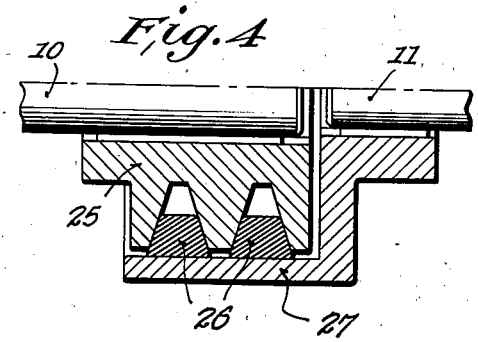
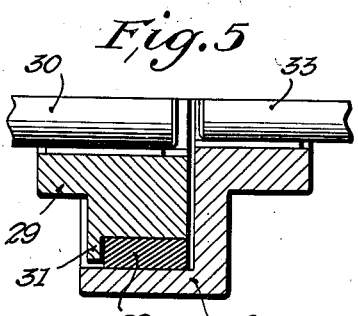
INVENTOR.
Monte F. Huebsch
BY Quarles & French
ATTORNEYS July 30, 1940.  M. F. HUEBSCH  2,209,774
CLUTCH COUPLING
Filed March 7, 1938    2 Sheets-Sheet 2
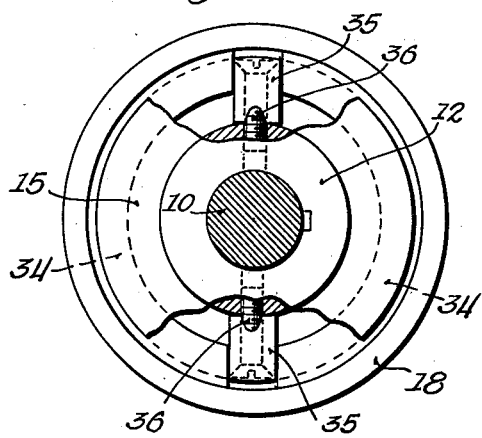
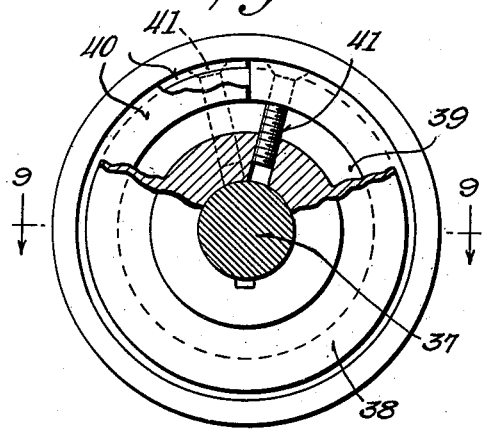
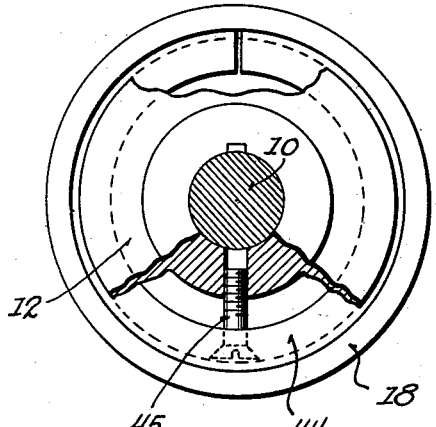
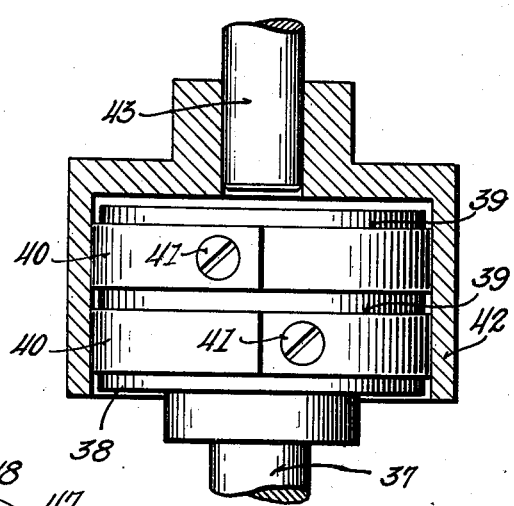
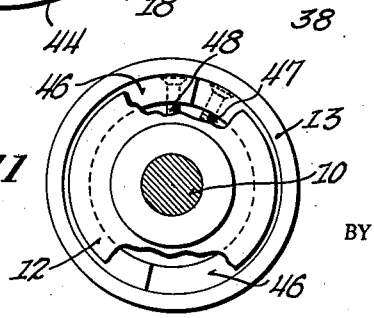
INVENTOR.
Monte F. Huebsch
BY Quarles & French
ATTORNEYS Patented July 30, 1940

2,209,774

UNITED STATES PATENT OFFICE 2,209,774

CLUTCH COUPLING

Monte F. Huebsch, Milwaukee, Wis., assignor to Huebsch Manufacturing Company, Milwaukee, Wis., a corporation of Wisconsin Application March 7, 1938, Serial No. 194,271

7 Claims. (Cl. 64—30)

The invention relates to clutch couplings.

The main object of the invention is to provide an automatic clutch for coupling two shafts together that may be slightly out of alignment and which allows a certain amount of slippage at the start and an efficient running engagement. More particularly the invention provides a clutch of very simple construction in which one or more flexible band member or members, under the action of centrifugal force, are used to directly connect the drive and driven members together after some slippage has taken place to facilitate the starting of electric motor drives where it is desirable to allow the motor to attain a certain speed before connecting directly with the driven member.

The invention further consists in the several features hereinafter set forth and more particularly defined by claims at the conclusion hereof.

In the drawings:

Fig. 1 is a vertical sectional view through a clutch coupling embodying the invention taken on the line 1—1 of Fig. 2;

Fig. 2 is an elevation view of the device shown in Fig. 1, parts being broken away and parts being shown in section;

Fig. 3 is a view showing one of the band driving members in expanded and contracted positions;

Fig. 4 is a vertical half section through a modified form of coupling;

Fig. 5 is a section similar to Fig. 4 showing another modification;

Fig. 6 is an enlarged detailed sectional view through the drive band member;

Fig. 7 is an elevation view of another modified form of device, parts being broken away and parts being shown in section;

Fig. 8 is an elevation view of another modified form of device, parts being broken away and parts being shown in section;

Fig. 9 is a sectional view taken on the line 9—9 of Fig. 8;

Fig. 10 is an elevation view of another modified form of device, parts being broken away and parts being shown in section;

Fig. 11 is an elevation view of another modified form of device, parts being broken away and parts being shown in section.

Referring to Figs. 1 to 3, the numeral 10 designates a drive shaft, 11 a driven shaft, 12 a coupling member mounted on the drive shaft, 13 a coupling member mounted on the driven shaft, and 14 a flexible band member for connecting said coupling members together.

The coupling member 12 comprises a flanged collar having a V-groove 15 formed therein and in some instances a radially disposed tapped or threaded hole 16 communicating with said groove. This member is keyed to the drive shaft 10 and is rigidly connected thereto by a set screw 17.

The coupling member 13 comprises a drum 18 having a hub 19, and it is keyed to the driven shaft 11 and is rigidly secured thereto by a set screw 20.

The band member 14 is preferably a section of V-belt which as usually constructed is formed of rubber impregnated fabric plies 21 and an outer rubber impregnated fabric covering 22. For one type of belt material of this character reference is made to U. S. Patent No. 2,024,443, dated December 17, 1935, to Abraham L. Freedlander. In the specific form of the invention herein shown the length of the band 14 is such as to extend around the coupling member 12 so that one end abuts or substantially abuts one side of a block 23 secured in the groove 15 by a screw 24 in threaded engagement with the hole 16, and the other end abuts or substantially abuts the other side of the block.

The diameter of the inner wall of the drum 18 is somewhat larger than the grooved portion of the member 12, and the outer portion of the band projects from the groove 15 so as to substantially fill the clearance space between said drum 18 and member 12 when the parts are assembled together. Fig. 3 shows that the band member 14 is flexible enough so as to be bent from an elongated to a rounded form.

With the above construction when the drive shaft 10 is revolved, it carries the band member 14 along with it, and the advancing end of the band tends to abut against the block 23 while the other end of the band as well as the intermediate portion tends to crowd itself outwardly against the wall of the drum 18, and thus after a certain slippage has taken place, the band establishes a driving connection between the coupling members, and this will occur in either direction of rotation of the drive shaft 10. Owing to the fact that the band 14 is yieldable and has some initial play in the groove, the coupling members may be both angularly and laterally out of line without affecting the efficiency of the driving connection.

In some instances the block 23 may be omitted and the ends of the V-band 14 be brought together in the groove 15 and a good driving connection effected though there may be some slippage.

If greater clutching surface is desired, two or more bands may be associated with the coupling members as shown in Fig. 4 where the drive shaft 10 has a multiple V-groove pulley 25 keyed thereto to take a plurality of V-bands 26, each of which as in the first construction is movable into engagement with a drum 27 keyed to the driven shaft 11. This permits one band to grip before the other to gradually apply the load in case the bands are of unequal length or otherwise vary in construction. This multiple belt type of coupling also has the advantage of increasing the frictional force exerted without increasing the diameter of the clutch drum and the centrifugal force exerted by the clutching parts.

Instead of a V-shaped band member a flat flexible belt type band member 28 may be used in connection with a coupling member 29 on the drive shaft 30 and having a flange 31 against which one side of the band may abut while the other side of said band is limited in its movement by the base of the drum 32 which is keyed to the driven shaft 33. The block 23 is used with the flat belt form of drive connection, and this flexible band member like the V-band permits of a certain amount of slippage and then a gripping of the drum 32 to form a driving connection for either direction of rotation of the drive shaft 30.

In the form shown in Fig. 7, the drive shaft 10 and its coupling member 12, the driven drum 18 and its shaft (not shown) are the same as in the first described construction. The modification consists in using what may be termed two half band members 34 instead of the single band member 14, the ends of these members 34 adapted to abut the adjacent sides of diametrically disposed blocks 35 secured in the V-groove 15 by the screws 36. The band members 34 operate similar to the band 14 to provide a clutching engagement between the member 12 and the drum 18 after a certain amount of slippage relative to these members has taken place.

In the form shown in Figs. 8 and 9 the drive shaft 37 carries a coupling member 38, similar to the member 25, and having spaced V-grooves 39 in each of which a flexible V-band 40 is mounted and anchored at one end by a screw 41 passing through said end and into a threaded hole in said member 38. These band members 40 are anchored at opposite ends relative to each other and are slidably fitted into the drum 42 on the driven shaft 43 and are adapted to engage said drum to drive the same. However, with this construction when the shaft 37 is rotated in a clockwise direction, there will be a drag on the lower band member and a release of the upper band, as viewed in Fig. 9, and the opposite effect will take place when the shaft 37 is rotated in the opposite direction, it being noted that the band member whose loose end is the advancing end, under the action of centrifugal force, acts to jam or force itself into a driving connection between the coupling members after a certain amount of slippage has taken place. It is also to be noted that each of these band members provides a one way clutch connection and that the two together provide a drive in either direction. The one way clutch connection per se has been made the subject of a separate application Serial No. 194,270, filed March 7, 1938.

In the form shown in Fig. 10, the drive shaft 10 and its coupling member 12, the driven drum 18 and its shaft (not shown) are the same as in the first described construction. The modification consists in using a band member 44 which is anchored, intermediate its ends, to the drive coupling 12 by the screw 45. This construction acts similar to the two band construction of Figs. 8 and 9 to provide a drive in either direction, there being a slip on one free end and a drag on the other, but since only half of the length of the band is effective for driving in any one direction, it only has half of the grip of the double band construction of Fig. 9, it being noted that in Fig. 10 two half-length band one way drive connections are provided.

In the forms shown in Figs. 7 to 10 inclusive while V-type bands have been shown, a flat band or bands, similar to the member 28, may be used if desired.

In the form shown in Fig. 11, two half-length band members 46 are shown associated with the coupling members 12 and 13 of the first described construction, one of these band members being anchored by the screw 47 to the coupling member 12 at the end adjacent which the other band member is anchored by the screw 48. With this construction each half length of band will act to establish a one way drive connection when the drive coupling 12 is turned, one band member establishing this drive for one direction of rotation and the other drive member establishing the drive for the other direction of rotation, there being a certain amount of slippage before either driving connection is effected.

It is to be noted that the coupling members may be made on automatic so-called screw machines, and the bands may be formed from suitable belt material so that the coupling can be produced at low cost, and that its assembly is a very simple matter and quickly effected.

I desire it to be understood that this invention is not to be limited to any specific form or arrangement of parts except in so far as such limitations are included in the appended claims.

What I claim as my invention is:

1. In a coupling, the combination of a drive shaft provided with a coupling member having a circumferential V-groove, a driven coupling member, and a flexible V-band member of laterally yieldable material having a free leading end and having an angular portion drivingly mounted in said groove and a peripheral portion drivingly engageable under frictional force and the action of centrifugal force with said driven coupling member on the rotation of said drive shaft, said V-band substantially filling the clearance space between said members whereby on the rotation of said drive shaft in a direction to push said band around said driven member the frictional gripping of said band member with said driven coupling member under the action of centrifugal force and the relative movement between said coupling members acts to spread said band laterally and thus wedge said band firmly against the sides of said groove.

2. In a coupling, the combination of a drive shaft, a driven shaft, a coupling member mounted on the drive shaft and having a band-receiving recess, a coupling member mounted on the driven shaft and having a drum portion, and a flexible wedgable band member substantially filling the space radially between said coupling members, said band having a free leading end and having a portion drivingly mounted in said recess and wedged against the side of the same while the peripheral portion is drivingly engaged with the drum under the action of friction between said band member and drum and centrifugal force.

3. In a coupling, the combination of a drive shaft, a driven shaft, a coupling member mounted on said drive shaft and having a band-receiving recess, a coupling member mounted on the driven shaft and having a drum portion, and a flexible band member of yieldable fibrous material substantially filling the space radially between said coupling members, a stop member in said recess with which an end of the band engages as said drive shaft is rotated, said band member having a free leading end and having a portion mounted in said recess and spread laterally against the sides of the same while the peripheral portion is drivingly engaged with the drum under the action of friction between said band member and drum and centrifugal force.

4. In a coupling, the combination of a drive shaft, a driven shaft, a coupling member mounted on said drive shaft and having a band-receiving recess, a coupling member mounted on said driven shaft and having a drum portion, and a flexible wedgable band member substantially filling the space radially between said coupling members, said band having a free leading end and having a portion mounted in said recess and wedged against the sides of the same while its peripheral portion is drivingly engaged with the drum under the action of friction between said band member and drum and centrifugal force, said band being secured intermediate its ends to the first named coupling member.

5. In a coupling, the combination of a drive shaft, a driven shaft, a coupling member mounted on said drive shaft and having a band-receiving recess, oppositely disposed stop members in said recess, a coupling member mounted on the driven shaft and having a drum portion, and flexible wedgable band members each having a free leading end disposed between said coupling members for driving engagement therewith and each band member substantially filling the space radially between said coupling members and having a portion mounted in one of said recesses between said stop members and wedged against the sides of said recess while its peripheral portion is drivingly engaged with the drum under the action of friction between said band member and drum and centrifugal force.

6. In a coupling, the combination of a drive coupling provided with a V-groove, a driven coupling member including a drum encircling the grooved portion of said drive coupling member, a flexible V-band coupling means mounted between said coupling members and positively driven by said drive coupling and frictionally engaging said driven coupling, said V-band coupling means having a free leading end and substantially filling the space radially between said coupling members, the relative movement of said coupling members acting through friction and centrifugal force to crowd and wedge said coupling means against said drum and the sides of said groove to provide a driving engagement of said driven coupling member.

7. In a coupling, the combination of a drive coupling provided with band engaging groove, a driven coupling including a drum encircling the grooved portion of said drive coupling member, flexible band coupling means mounted between said coupling members and positively driven by said drive coupling and frictionally engaging said driven coupling, said band coupling means having a free leading end and substantially filling the radial clearance space between said coupling members, the relative rotary movement of said coupling members acting through friction and centrifugal force to crowd and wedge said coupling means against the sides of said groove and against said drum to provide a driving engagement in either direction of rotation of said drive coupling member.

MONTE F. HUEBSCH.